United States Patent
Zhou et al.

(10) Patent No.: US 12,372,820 B2
(45) Date of Patent: Jul. 29, 2025

(54) DISPLAY MODULE, METHOD OF MANUFACTURING DISPLAY MODULE, AND SPLICED MODULE

(71) Applicant: Shenzhen China Star Optoelectronics Semiconductor Display Technology Co., Ltd., Guangdong (CN)

(72) Inventors: Mingjun Zhou, Guangdong (CN); Guofu Tang, Guangdong (CN); Jianyu Chang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 329 days.

(21) Appl. No.: 18/070,663

(22) Filed: Nov. 29, 2022

(65) Prior Publication Data

US 2024/0126111 A1   Apr. 18, 2024

(30) Foreign Application Priority Data

Oct. 13, 2022   (CN) .......................... 202211252803.7

(51) Int. Cl.
*H05K 5/02*   (2006.01)
*G02F 1/1333*   (2006.01)

(52) U.S. Cl.
CPC .... *G02F 1/133317* (2021.01); *G02F 1/13336* (2013.01)

(58) Field of Classification Search
CPC ............................ H05K 5/0017; H05K 5/0217
USPC .......................................... 361/807, 809, 810
See application file for complete search history.

(56) References Cited

U.S. PATENT DOCUMENTS

| | | | |
|---|---|---|---|
| 2009/0262277 A1* | 10/2009 | Kim | H05K 1/147 349/187 |
| 2011/0002112 A1* | 1/2011 | Hsu | G02F 1/133308 361/829 |
| 2012/0001830 A1* | 1/2012 | Xia | G09G 3/20 345/1.2 |

(Continued)

FOREIGN PATENT DOCUMENTS

| | | | | |
|---|---|---|---|---|
| CN | 105204210 A | * | 12/2015 | ........... G02F 1/1333 |
| CN | 206638918 U | * | 11/2017 | ........... G02F 1/1333 |
| CN | 111552116 | | 8/2020 | |

(Continued)

OTHER PUBLICATIONS

Notification of Office Action and Search Report Dated Feb. 26, 2025 From The State Intellectual Property Office of the People's Republic of China Re Application No. 202211252803.7 and Its Translation Into English. (19 Pages).

*Primary Examiner* — Hung S. Bui

(57) ABSTRACT

A display module, a manufacturing method of the display module, and a spliced module are provided. The display module includes a middle frame, a plurality of planarization layers, and a display panel. A plurality of accommodating grooves are formed on a surface of the middle frame, and the planarization layers are respectively disposed in the accommodating grooves. Supporting surfaces of the planarization layers are coplanar. The display panel is disposed on the supporting surfaces of the planarization layers by a plurality of bonding adhesives. Since the planarization layers are formed by a leveling processing, the planarization layer has good surface flatness.

17 Claims, 5 Drawing Sheets

(56) References Cited

U.S. PATENT DOCUMENTS

2024/0036617 A1\* 2/2024 Zheng .................. G06F 1/1681

FOREIGN PATENT DOCUMENTS

| | | | | |
|---|---|---|---|---|
| CN | 113270043 | | 8/2021 | |
| CN | 114203051 A | \* | 3/2022 | ........... G06F 1/1616 |
| CN | 216210330 U | \* | 4/2022 | ........... G02F 1/1333 |
| CN | 114863811 A | \* | 8/2022 | ........... F16F 15/067 |
| WO | WO-2021100976 A1 | \* | 5/2021 | ....... G02F 1/133314 |

\* cited by examiner

DISPLAY MODULE, METHOD OF MANUFACTURING DISPLAY MODULE, AND SPLICED MODULE

CROSS-REFERENCE TO RELATED APPLICATION

This application claims the benefit of priority of China Patent Application No. 202211252803.7, filed on Oct. 13, 2022, in the China National Intellectual Property Administration, the disclosure of which is incorporated by reference herein in its entirety.

TECHNICAL FIELD

The present disclosure relates to a display field, and more particularly, to a display module, a manufacturing method of the display module, and a spliced module.

BACKGROUND

With the development of display technology, larger-sized displays are attracting attention of various manufacturers. Due to the limitation of the manufacturing process, sizes of the displays are limited, and thus spliced displays are developed. The spliced display is formed by splicing two or more display modules to form a large-sized screen display. The spliced display may be configured to realize a display effect of a large scene, and may bring an immersive visual experience to users. Therefore, the spliced display is widely applied in various industries, e.g., a control room, a digital label, or a building field. The spliced display is widely available in our lives.

A main disadvantage of spliced displays is a seam between adjacent display modules. Therefore, a width of the seam to realize seamless spliced displays has always been an effort of the related art. In the research and practice of the prior art, the inventors of the present disclosure have found that, because the display modules do not have a good flatness, and adjacent display modules have the different flatness, unevenness occurs at the seam between the adjacent display modules. Further, when the seam is uneven, the spliced displays may easily leak light.

SUMMARY

An embodiment of the present disclosure provides a display module, a manufacturing method of the display module, and a spliced module, which may improve a problem of poor flatness of the display module.

An embodiment of the present disclosure provides a display module including:
- a middle frame, wherein a plurality of accommodating grooves are disposed on a surface of the middle frame;
- a plurality of planarization layers, respectively disposed in the plurality of accommodating grooves, wherein supporting surfaces of the plurality of planarization layers are coplanar; and
- a display panel adhered onto the supporting surfaces of the plurality of planarization layers by a plurality of bonding adhesives, respectively.

In this configuration, the plurality of planarization layers are respectively disposed in the plurality of accommodating grooves. Since the plurality of planarization layers are formed by a leveling process, the planarization layers have good surface flatness. By providing the display panel on the planarization layers, flatness of the display panel can be improved, thereby improving the problem of the poor flatness of the display module.

Alternatively, in some embodiments of the present disclosure, a thickness of each of the plurality of planarization layers is less than or equal to a depth of each of the plurality of accommodating grooves.

In this configuration, the planarization layers are disposed only in the accommodating grooves, so that excessive material of the planarization layers may be prevented from overflowing onto the surface of the middle frame when the planarization layers are manufactured, thereby causing unevenness surfaces of the planarization layers. Therefore, the flatness of the surfaces of the planarization layers may be effectively improved.

Alternatively, in some embodiments of the present disclosure, the middle frame includes supporting portions disposed on a side of the plurality of bonding adhesives away from the display panel, the plurality of accommodating grooves are respectively disposed on surfaces of the supporting portions, and surfaces of the plurality of bonding adhesives close to the display panel protrude with respect to the surfaces of the supporting portion.

In this configuration, the surfaces (e.g., the upper surfaces) of the bonding adhesives at a side away from the planarization layers is higher than the surfaces (e.g., the upper surfaces) of the planarization layers, so that the display panel is supported on the bonding adhesives in the thickness direction. A surface (e.g., a lower surface) of the display panel and the surfaces (e.g., the upper surfaces) of the supporting portions are disposed apart from each other. Therefore, the display panel may be prevented from being supported on the surface of the supporting portions, and the flatness of the display panel may be improved.

Alternatively, in some embodiments of the present disclosure, the middle frame includes at least two frame bodies disposed corresponding to side edges of the display panel, and the plurality of accommodating grooves are respectively disposed on surfaces of two of the frame bodies disposed opposite to each other.

In this configuration, the accommodating grooves are respectively disposed on the surfaces of the frame bodies disposed opposite to each other, so that the flatness of the display panel may be improved, thereby improving the problem of the poor flatness of the display module.

Alternatively, in some embodiments of the present disclosure, a height difference between heights of bottom surfaces of the plurality of accommodating grooves is smaller than a depth of any of the plurality of accommodating grooves.

In this configuration, the height difference between the bottom surfaces of different accommodating grooves is smaller than the depth of any of the accommodating grooves, so that the supporting surfaces of the planarization layers in the different accommodating grooves are coplanar, thereby improving the problem of the poor flatness of the display module.

Alternatively, in some embodiments of the present disclosure, the display panel is in a rectangular shape, the frame bodies are disposed at four side edges of the middle frame corresponding to four side edges of the display panel, and the plurality of accommodating grooves are respectively disposed on the frame bodies at the four side edges of the display panel.

In this configuration, the four side edges of the display panel are uniformly supported on the corresponding frame bodies. Therefore, the flatness of the display panel may be improved, thereby improving the problem of the poor flatness of the display module.

Alternatively, in some embodiments of the present disclosure, each of the frame bodies is disposed with a corresponding one of the plurality of accommodating grooves.

Alternatively, at least one of the frame bodies is disposed with at least two corresponding accommodating grooves of the plurality of accommodating grooves.

In this structure, when at least one of the frame bodies is disposed with a corresponding one of the plurality of accommodating grooves, the middle frame has a simple structure and thus easy to manufacture. For each frame body, the planarization layers are manufactured and the bonding adhesives are assembled only in a corresponding accommodating groove, thereby effectively simplifying the manufacturing process of the display module. When at least one of the frame bodies is disposed with at least two corresponding accommodating grooves of the plurality of accommodating grooves, material costs of the planarization layers and the bonding adhesives may be reduced, thereby reducing the manufacturing process.

Alternatively, in some embodiments of the present disclosure, the display panel includes a display area and a light-transmitting area, and the light-transmitting area is disposed on at least one side of the display area; and
wherein the display module further includes an auxiliary display module disposed between the light-transmitting area of the display panel and a corresponding one of the frame bodies, and the auxiliary display module is located on a side of a corresponding one of the plurality of bonding adhesives.

In this structure, the light-transmitting region is disposed at the side edges of the display module, and light emitted from the auxiliary display module may be transmitted through the light-transmitting region, thereby realizing a narrow frame or frameless design of the display module.

Alternatively, in some embodiments of the present disclosure, a sinking tank is disposed on surfaces of the frame bodies, and the auxiliary display module is at least partially disposed in the sinking tank.

In this structure, the sinking tank is disposed on the frame body, and the auxiliary display module is at least partially disposed in the sinking tank. With an avoidance structure of the sinking tank described above, the display panel may not be supported on the surface of the frame body through the auxiliary display module in the thickness direction, but may be supported on the planarization layer through the bonding adhesive in the thickness direction. Therefore, the flatness of the display panel may be improved, and the auxiliary display module is prevented from being crushed during an assembly process.

An embodiment of the present disclosure further provides a method for manufacturing a display module, including:
providing a middle frame, wherein the accommodating groove is disposed on a surface of the middle frame;
forming a planarization layer in the accommodating groove; and
bonding the display panel onto the planarization layer by using a bonding adhesive.

In this configuration, the planarization layers are disposed in the accommodating grooves. Since the planarization layers are formed by the leveling process, the planarization layers have good surface flatness. By providing the display panel on the planarization layers, the flatness of the display panel may be improved, thereby improving the problem of the poor flatness of the display module.

An embodiment of the present disclosure further provides a spliced module including at least two display modules spliced to each other, wherein each of the display modules display modules may be one of the above display modules;
wherein a portion of the middle frame at a non-spliced side of the display panel includes supporting portions disposed on a side of the plurality of bonding adhesives away from the display panel and baffle plats disposed on the non-spliced side of the display panel, a portion of the plurality of accommodating grooves are disposed on surfaces of the supporting portions, and a portion of the middle frame at a spliced side of the display panel is disposed on the side of the plurality of bonding adhesives away from the display panel.

In this configuration, the spliced module is formed by using the above-described display module, the problem of unevenness at the seam between the adjacent display modules may be improved.

An embodiment of the present disclosure provides a display module, a manufacturing method of the display module, and a spliced module. A plurality of accommodating grooves are formed on a middle frame, and planarization layers are respectively disposed in the accommodating grooves. Since the planarization layers are formed by a leveling processing, the planarization layer has good surface flatness, and supporting surfaces of the planarization layers are coplanar. By providing the display panel on the supporting surfaces of the planarization layers, the flatness of the display panel can be improved. The spliced module is formed by using the above-described display module, the problem of unevenness at the seam between the adjacent display modules may be improved.

BRIEF DESCRIPTION OF THE DRAWINGS

In order for more clearly describing technical solutions in embodiments of the present disclosure, brief description will be given below with reference to the accompanying drawings which are illustrated for describing the embodiments. The accompanying drawings in the following description merely illustrate some embodiments of the present disclosure. For those skilled in the art, other drawings may be obtained from these drawings without creative effort.

DESCRIPTION OF SPECIFIC EMBODIMENTS OF THE INVENTION

Figure 1:
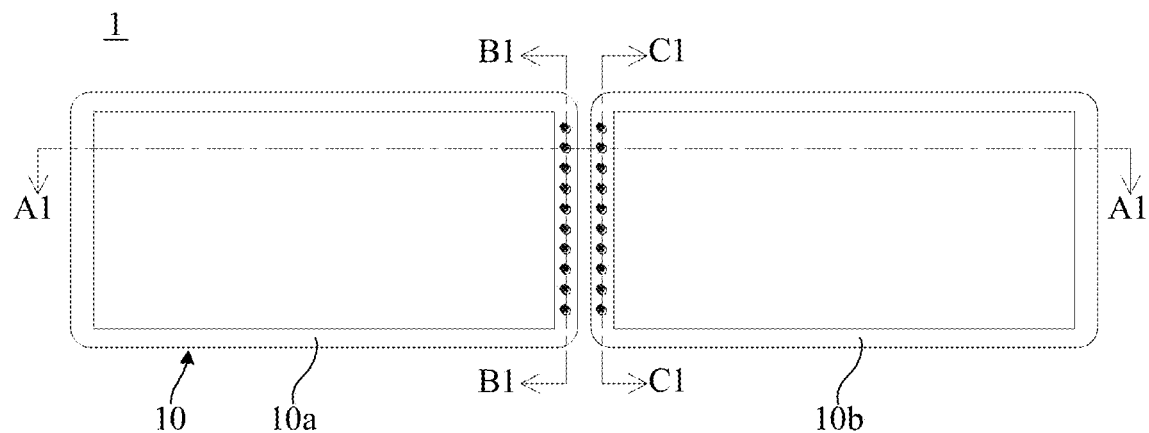
FIG. 1 is a schematic top view of a spliced display.

Technical solutions in embodiments of the present disclosure will be clearly and completely described with reference to the accompanying drawings in the embodiments of the present disclosure. It will be apparent that the described embodiments are only part of the embodiments of the present disclosure, and not all of the embodiments. Based on the presented embodiments in the present disclosure, all other embodiments obtained by a person skilled in the art without involving any inventive effort are within the scope of the present disclosure. Furthermore, it should be understood that the specific embodiments described herein are merely illustrative and explanatory of the present disclosure and are not intended to limit the present disclosure. In the present disclosure, unless described to the contrary, the use of positional terms such as "upper" and "down" generally refer to the up and down in the device in actual use or operation state, specifically, the drawing direction in the drawings. The "inside" and "outside" is provided with respect to the outline of the device.

Figure 2:
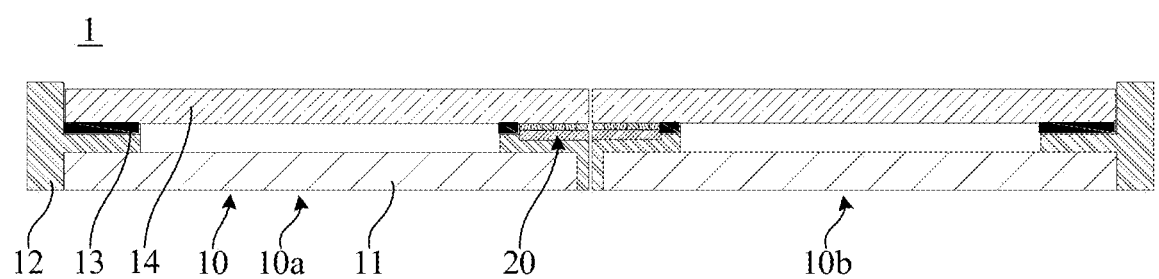
FIG. 2 is a schematic sectional view taken along a direction A1-A1 in FIG. 1.

Referring to FIGS. 1 and 2, a spliced display 1 includes at least two display modules 10 spliced to each other. Each of the display module 10 includes a backlight module 11, a middle frame 12 disposed on the backlight module 11, and a display panel 14 adhered to the middle frame 12 by a bonding adhesive 13.

Figure 3:
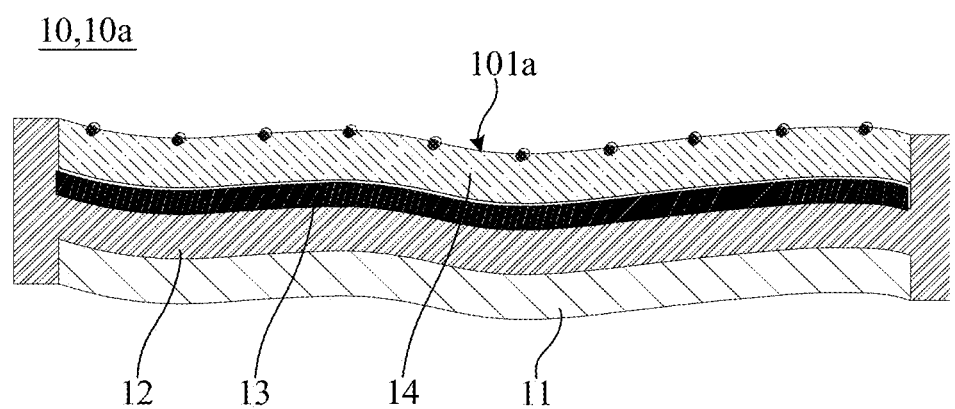
FIG. 3 is a schematic sectional view taken along a direction B1-B1 in FIG.
Figure 4:
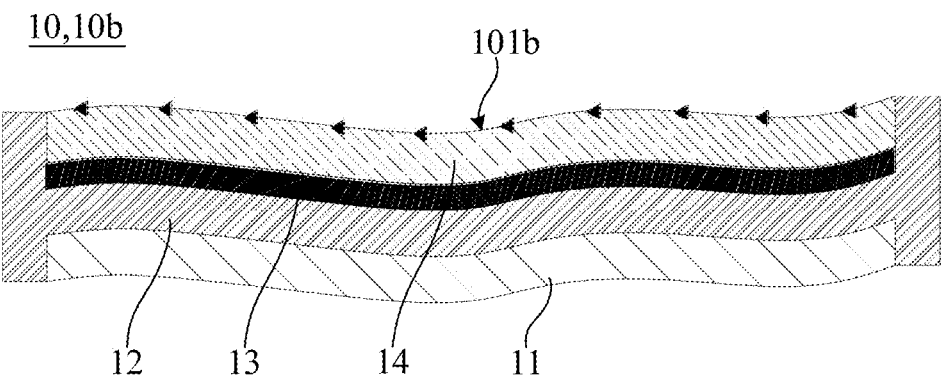
FIG. 4 is a schematic sectional view taken along a direction C1-C1 in FIG. 1.
Figure 5:
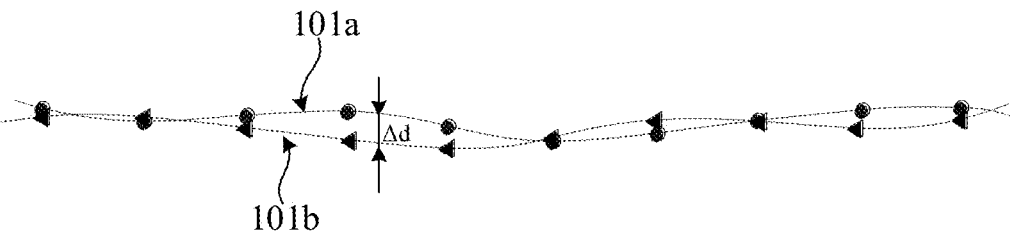
FIG. 5 is a fitting schematic diagram of cross-sectional curves of adjacent display modules of a spliced display.

As shown in FIGS. 3 to 5, the display modules 10 are not absolutely flat. Specifically, an interface between the middle frame 12 and the display panel 14 is not completely flat, which may result in a difference in surface flatness for different display modules 10. Since surfaces (e.g., upper surfaces) of adjacent display modules 10 are not match, unevenness may occur at a seam between the adjacent display modules 10, and a user may easily observe traces of the seam with a sideways viewing angle.

For ease of explanation, the spliced display 1 including two kinds of display modules 10 is described as an example. The spliced display 1 includes a first display module 10a of a first flatness and a second display module 10b of a second flatness. The flatness is associated with a size of the display module 10. For example, for a 75-inches first display module 10a and a 75-inches second display module 10b, the first flatness and the second flatness may be up to 1 mm.

As shown in FIG. 3, a section curve 101a of the first display module 10a may be obtained by fitting 10 points taken from a cross section of the first display module 10a. Similarly, as shown in FIG. 4, a cross section curve 101b of the second display module 10b may be obtained by fitting 10 points taken from a cross section of the second display module 10b. As shown in FIG. 5, the cross section curve 101a of the first display module 10a and the section curve 101b of the second display module 10b are fitted and spliced. Since the first display module 10a has different surface flatness from the second display module 10b, a height difference Δd may be formed between the section curve 101a of the first display module 10a and the section curve 101b of the second display module 10b and at different positions, so that it is uneven at the seam. In practical application, for example, for the 75-inches first display module 10a and the 75-inches second display module 10b, the height difference Δd may be up to 1.5 mm.

Figure 6:
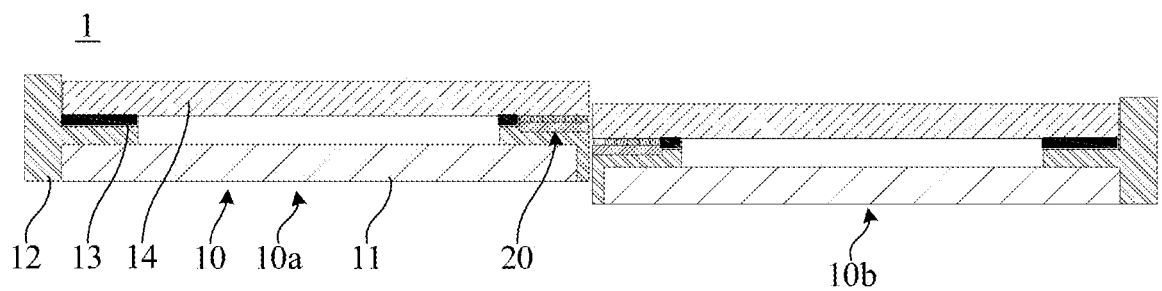
FIG. 6 is a schematic view showing a height difference at a seam of a spliced display.

In order to eliminate splicing seam marks, a frame of the display module is disposed to be transparent. A light-emitting diode (LED) module 20 is disposed below the frame, so that an image may be displayed at the frame of the display module 10, thereby facilitating reduction of the seam. When the height difference Δd is formed at the seam between the first display module 10a and the second display module 10b, light emitted from the light-emitting diode module 20 may easily exit through the seam, resulting in a light leakage phenomenon. As shown in FIG. 6, when the height difference Δd is greater than 0.3 mm, a light leakage phenomenon may be viewed by the user with a viewing angle greater than 45 degrees. However, in the above spliced display 1, the height difference Δd between the first display module 10a and the second display module 10b may reach 1.5 mm, and the light-emitting diode module 20 may even be directly exposed, so that the light leakage is serious. As a result, the spliced display 1 cannot be mass-produced, and the user cannot accept the above-mentioned disadvantages.

To solve the above problems, an embodiment of the present disclosure provides a display module, a method for manufacturing the display module, and a spliced module. Detailed descriptions are provided below. It should be noted that an order in which the following embodiments are described is not intended to limit the preferred order of the embodiments.

Figure 7:
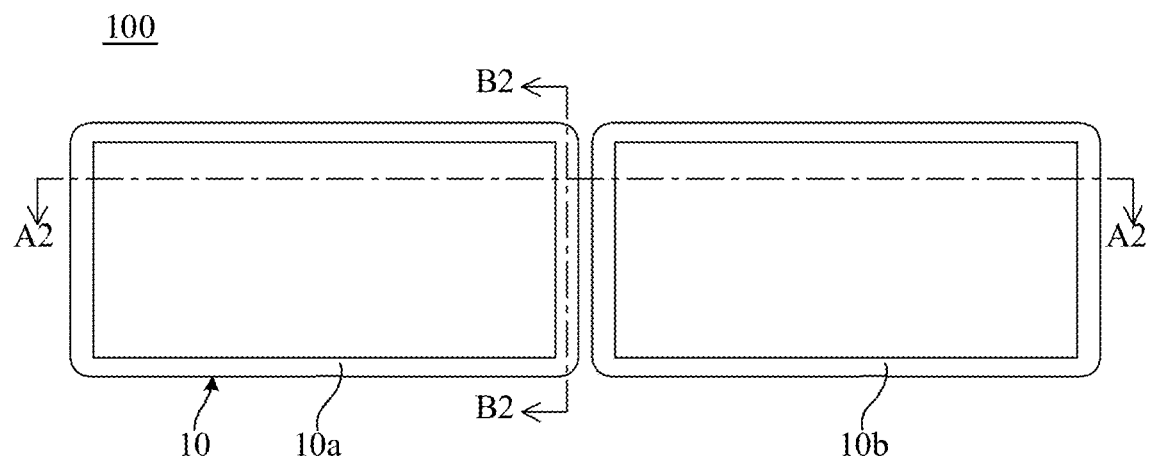
FIG. 7 is a schematic top view of a spliced module according to an embodiment of the present disclosure.

Referring to FIG. 7, an embodiment further provides a spliced module 100. The spliced module 100 includes at least two display modules 110 spliced to each other. The at least two display modules 110 are arranged in an array. In an embodiment of the present disclosure, the spliced module 100 includes two display modules 110. A number of the display modules 110 in the spliced module 100 may be appropriately adjusted according to actual situations and specific requirements. That is, the spliced module 100 may include three or more display modules 110. The number of the display modules 110 is not limited herein.

Figure 8:
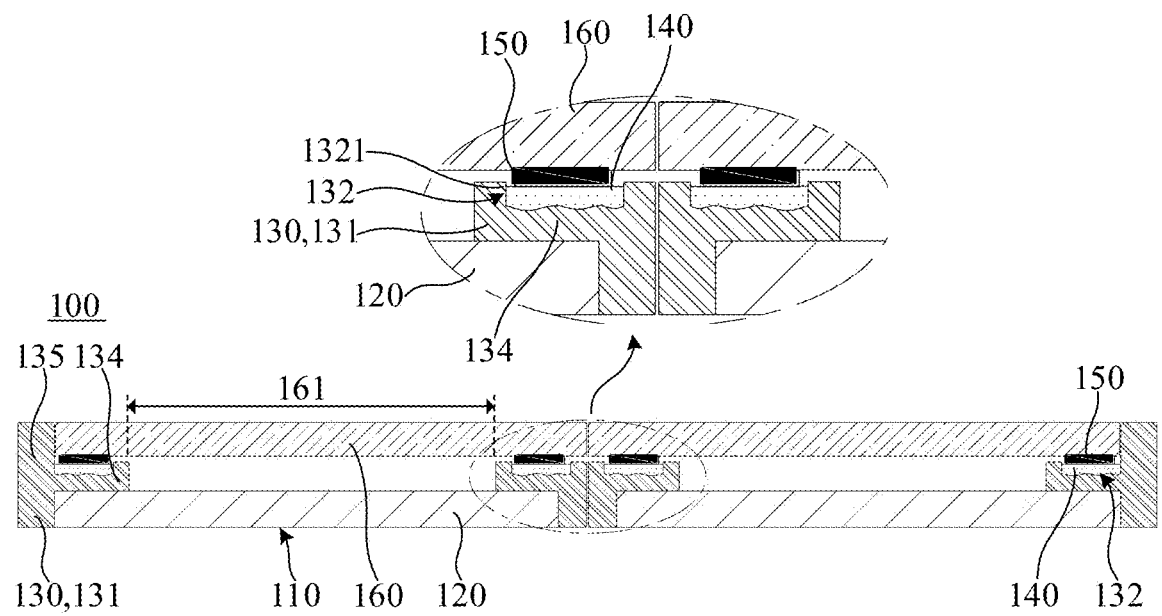
FIG. 8 is a schematic cross-sectional view taken along a direction A2-A2 in FIG. 7.
Figure 9:
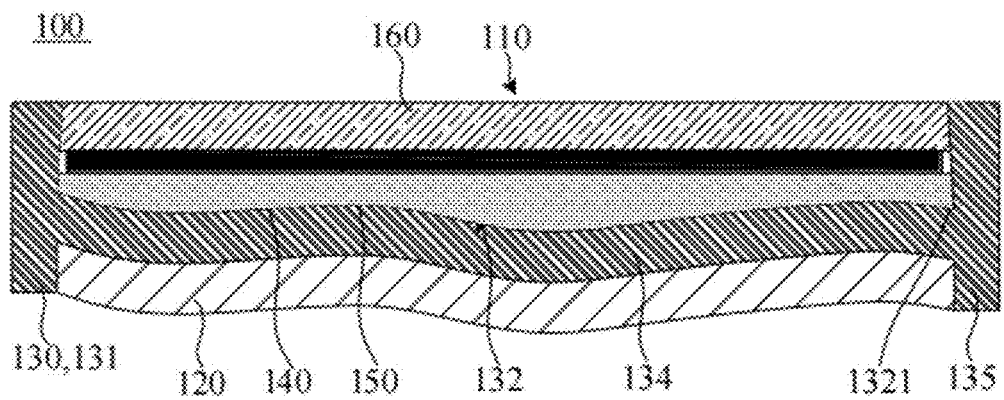
FIG. 9 is a schematic sectional view taken along a direction B2-B2 in FIG. 7.

Specifically, as shown in FIGS. 7 to 9, each of the display modules 110 may include a middle frame 130, a plurality of planarization layers 140, a plurality of bonding adhesives 150, and a display panel 160. A plurality of accommodating grooves 132 are disposed on a surface (e.g., an upper surface) of the middle frame 130. A plurality of planarization layers 140 are respectively disposed in the plurality of accommodating grooves 132. Supporting surfaces (that is, upper surfaces) of the plurality of planarization layers 140 are coplanar. The display panel 160 is adhered onto the plurality of planarization layers 140 by the plurality of bonding adhesives 150, respectively. Note that the surface (e.g., the upper surface) of the middle frame 130 refers to a side surface of the middle frame 130 close to the display panel 160. In this configuration, the planarization layers 140 are respectively disposed in the accommodating grooves 132. Since the planarization layers 140 are formed by a leveling process, the planarization layers 140 have good surface flatness. By providing the display panel 160 on the planarization layers 140, flatness of the display panel 160 can be improved, so that the flatness of the display panel 160 may be 0.1 mm or less, thereby improving the problem of poor flatness of the display module 110.

It should be noted that since the flatness of the display module 110 in an embodiment of the present disclosure may be 0.1 mm or less, different display modules 110 have substantially the same flatness. Therefore, under the condition that the spliced module 100 is manufactured by using the above display module 110, the unevenness at the seam can be improved, and the problem of poor optical quality such as light leakage can be avoided, so that the spliced module 100 can be mass-produced.

Specifically, the bonding adhesive 150 may be a light-shielding adhesive, and the light-shielding adhesive may be a double-sided adhesive tape. A material of the bonding adhesive 150 may be appropriately changed according to the actual conditions and the specific requirements, which is not limited herein.

Specifically, as shown in FIGS. 8 and 9, a thickness of the planarization layer 140 may be less than or equal to a depth of the accommodating groove 132. In this configuration, the planarization layer 140 is disposed only in the accommodating groove 132, so that excessive material of the planarization layer 140 may be prevented from overflowing onto the surface of the middle frame 130 when the planarization layer 140 is manufactured, thereby causing an unevenness surface of the planarization layer 140. Therefore, the flatness of the surface of the planarization layer 140 can be effectively improved.

Specifically, as shown in FIGS. 8 and 9, if a contact angle of a side wall 1321 of the accommodating groove 132 is too small, the material of the planarization layer 140 is easily adhered to the side wall 1321 of the accommodating groove 132. Therefore, the surface (e.g., the upper surface) of the obtained planarization layer 140 is concave. If the contact angle of the side wall 1321 of the accommodating groove 132 is too large, the material of the planarization layer 140 is repellent to the side wall 1321 of the accommodating groove 132, so that the surface of the obtained planarization layer 140 is convex. To avoid the above problems, the contact angle of the side wall 1321 of the accommodating groove 132 may be in an arrange of 10°-15°. For example, the contact angle of the side wall 1321 of the accommodating groove 132 may be 10°, 11°, 12°, 13°, 14°, or 15°. In this case, the flatness of the surface of the planarization layer 140 can be improved, and the planarization layer 140 can be stably attached in the accommodating groove 132.

Specifically, as shown in FIGS. 8 and 9, the side wall 1321 of the accommodating groove 132 are substantially parallel to a thickness direction of the planarization layer 140. The side wall 1321 of the accommodating groove 132 may be inclined according to the actual situations and the specific requirements. For example, a width of the accommodating groove 132 is tapered from the bottom of the accommodating groove 132 toward the top, thereby preventing the planarization layer 140 from being detached from the accommodating groove 132.

Specifically, as shown in FIGS. 8 and 9, the middle frame 130 includes a supporting portion 134 disposed on a side of the bonding adhesive 150 away from the display panel 160. The accommodating groove 132 is disposed on a surface (e.g., an upper surface) of the supporting portion 134. A surface of the bonding adhesive 150 close to the display panel 160 protrudes with respect to the surface of the supporting portion 134. In this configuration, the surface (e.g., the upper surfaces) of the bonding adhesive 150 at a side away from the planarization layer 140 is higher than the surface (e.g., the upper surfaces) of the planarization layer 140, so that the display panel 160 is supported on the bonding adhesive 150 in the thickness direction. A surface (e.g., a lower surface) of the display panel 160 and the surface (e.g., the upper surface) of the supporting portion 134 are disposed apart from each other. Therefore, the display panel 160 may be prevented from being supported on the surface of the supporting portion 134, and the flatness of the display panel 160 may be improved.

Specifically, the middle frame 130 further includes a baffle plat 135 connected to a side of the supporting portion 134. The baffle 135 is disposed on a non-spliced side of the display panel 160. In an embodiment of the present disclosure, the display module 110 is configured to be spliced. The display module 110 has a spliced side and the non-spliced sides. A portion of the middle frame 130 at the non-splicing side includes a supporting portion 134 and a baffle 135. The supporting portion 134 is disposed on a side of the bonding adhesive 150 away from the display panel 160. The accommodating groove 132 is disposed on the surface (e.g., the upper surface) of the supporting portion 134. The baffle 135 is disposed on the non-splicing side of the display panel 160. A portion of the middle frame 130 at the spliced side is disposed on a side of the bonding adhesive 150 away from the display panel 160, and the portion of the middle frame 130 at the spliced side includes only the supporting portion 134. In this configuration, seamless splicing of adjacent display modules 110 may be achieved.

Figure 10:
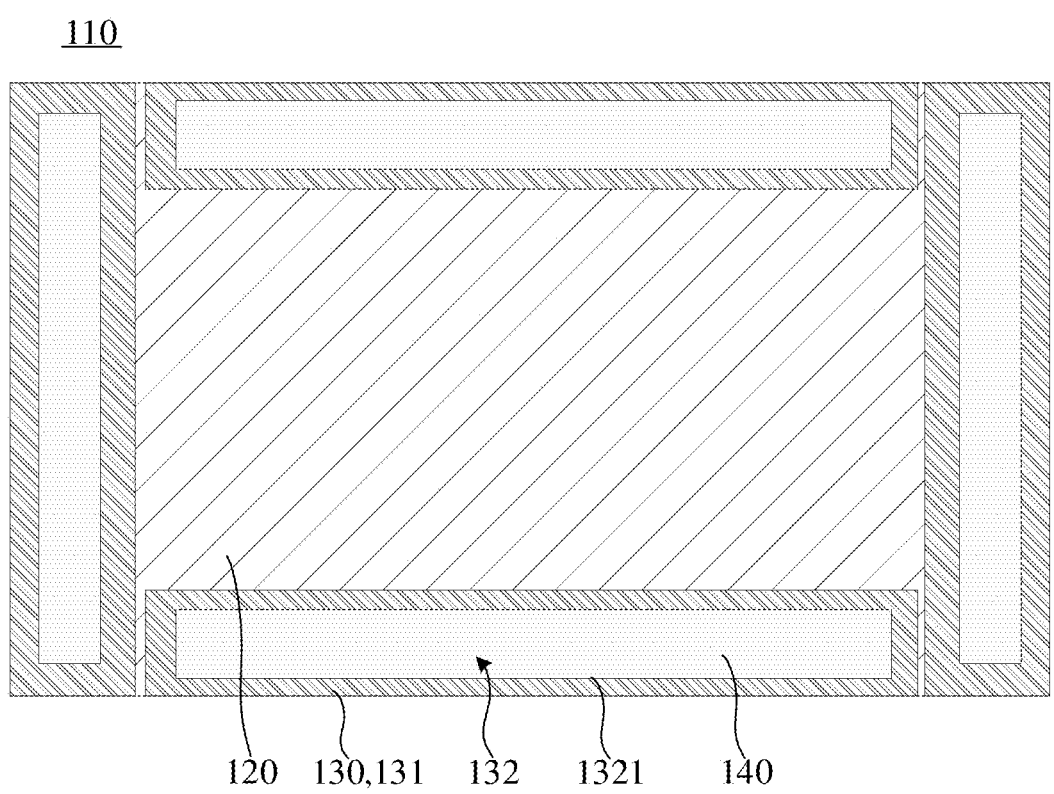
FIG. 10 is a schematic top view of a display module that omits a bonding adhesive and a display panel according to an embodiment of the present disclosure.
Figure 11:
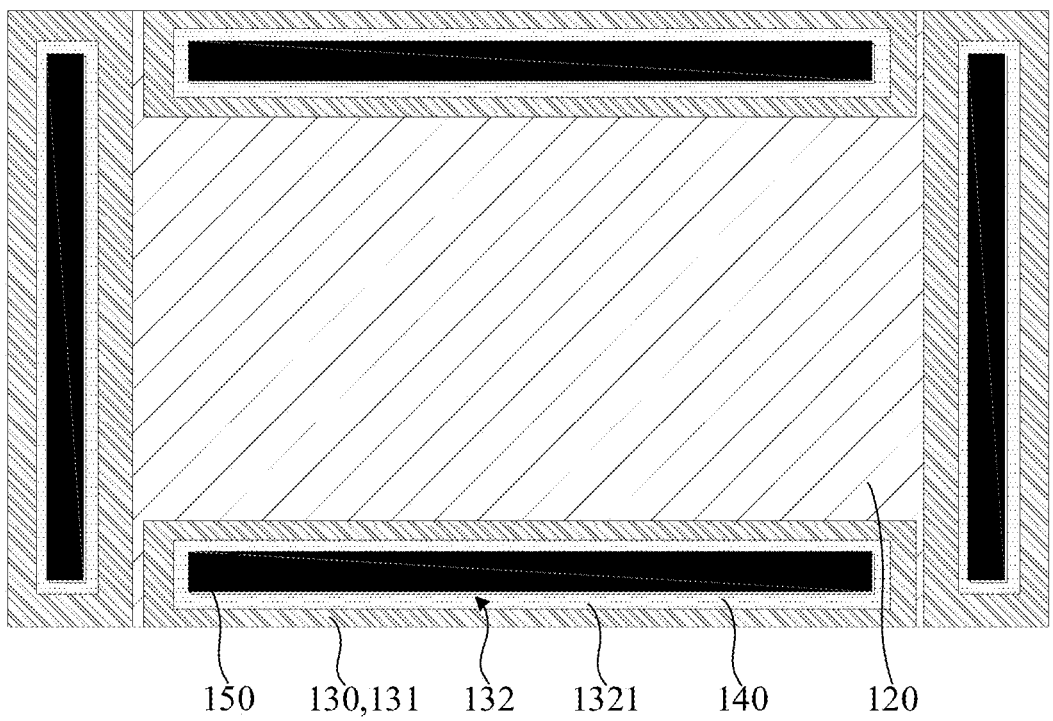
FIG. 11 is a schematic top view of a display module that omits a display panel according to an embodiment of the present disclosure.

Specifically, as shown in FIGS. 10 and 11, the middle frame 130 includes at least two frame bodies 131 disposed corresponding to side edges of the display panel 160. The accommodating grooves 132 are respectively disposed on surfaces (e.g., upper surfaces) of the frame bodies 131. The accommodating grooves 132 are respectively disposed on the surfaces of at least two of the frame bodies 131 disposed opposite to each other. In this configuration, the accommodating grooves 132 are respectively disposed on the surfaces of the frame bodies 131 disposed opposite to each other, so that the flatness of the display panel 160 can be improved, thereby improving the problem of the poor flatness of the display module 110.

Specifically, the display panel 160 is in a rectangular shape. The frame bodies 131 are disposed at four side edges of the middle frame 130 corresponding to the four side edges of the display panel 160. The accommodating grooves 132 are respectively disposed on frame bodies 131 at the four side edges of the display panel 160. In this configuration, the four side edges of the display panel 160 are uniformly supported on the corresponding frame bodies 131. Therefore, the flatness of the display panel 160 can be improved, thereby improving the problem of the poor flatness of the display module 110. In this embodiment, the frame body 131 at the spliced side only includes the supporting portion 134, and the frame body 131 at the non-spliced side includes the baffle 135 and the supporting portion 134.

It will be appreciated that a number of frame bodies 131 included in the middle frame 130 may be adjusted as appropriate, and will not be limited herein, according to the actual situations and the specific requirements.

Specifically, the surface of the display panel 160 closer to the supporting portion 134 is taken as a reference surface. The closer a bottom surface of the accommodating groove 132 is to the surface of the display panel 160 closer to the supporting portion 134, the higher a height of the bottom surface of the accommodating groove 132 is. A height difference between the heights of the bottom surfaces of different accommodating grooves 132 may be smaller than the depth of any of the accommodating grooves 132. In this configuration, the height difference between the bottom surfaces of different accommodating grooves 132 is smaller than the depth of any of the accommodating grooves 132, so that the supporting surfaces of the planarization layers 140 in the different accommodating grooves 132 are coplanar, thereby improving the problem of the poor flatness of the display module 110.

Specifically, the middle frame 130 may be of split-type. Different frame bodies 131 may be independently formed, and subsequently assembled into the middle frame 130. In this configuration, the middle frame 130 is of split-type, and the split-type middle frame 130 has a low requirement for a size of original material (wherein the original material is processed in a proper process, to form the split-type middle frame 130), and a manufactured time period can be shorted and a mold cost can be lower. Therefore, a manufactured cost can be reduced.

Alternatively, the middle frame 130 may be an integral whole. That is, the middle frame 130 is an integral connector, and the different frame bodies 131 are integrally connected. In this configuration, the middle frame 130 may be formed mainly by an integrated forming process, so that assembly errors can be reduced. In this embodiment, the accommodating grooves 132 of the different frame bodies 131 may be communicated with each other. Therefore, it is advantageous to ensure that the upper surfaces of the planarization layers 140 of the different frame bodies 131 may on the same level and thus have the same height, so that the display panel 160 is smoothly and flatly supported on the planarization layers 140.

Specifically, as shown in FIGS. 9 to 11, each frame body 131 is disposed with a corresponding one of the accommodating grooves 132 extending along a length direction of the frame body 131. Within each accommodating groove 132, a planarization layer 140 and a bonding adhesive 150 are disposed. In this configuration, the middle frame 130 has a simple structure and thus easy to manufacture. For each frame body 131, the planarization layer 140 is manufactured and the bonding adhesive 150 is assembled only in a corresponding accommodating groove 132, thereby effectively simplifying the manufacturing process of the display module 110.

In an embodiment of the present disclosure, a number of the accommodating grooves 132 on each frame body 131 may be adjusted appropriately as needed. For example, at least one of the frame bodies 131 is disposed with at least two accommodating grooves 132 arranged along the length direction of the frame body 131, two adjacent ones of the accommodating grooves 132 are disposed apart from each other, and within each accommodating groove 132, a planarization layer 140 and a bonding adhesive 150 are disposed. In this configuration, material costs of the planarization layer 140 and the bonding adhesive 150 can be reduced, thereby reducing the manufacturing process.

Figure 12:
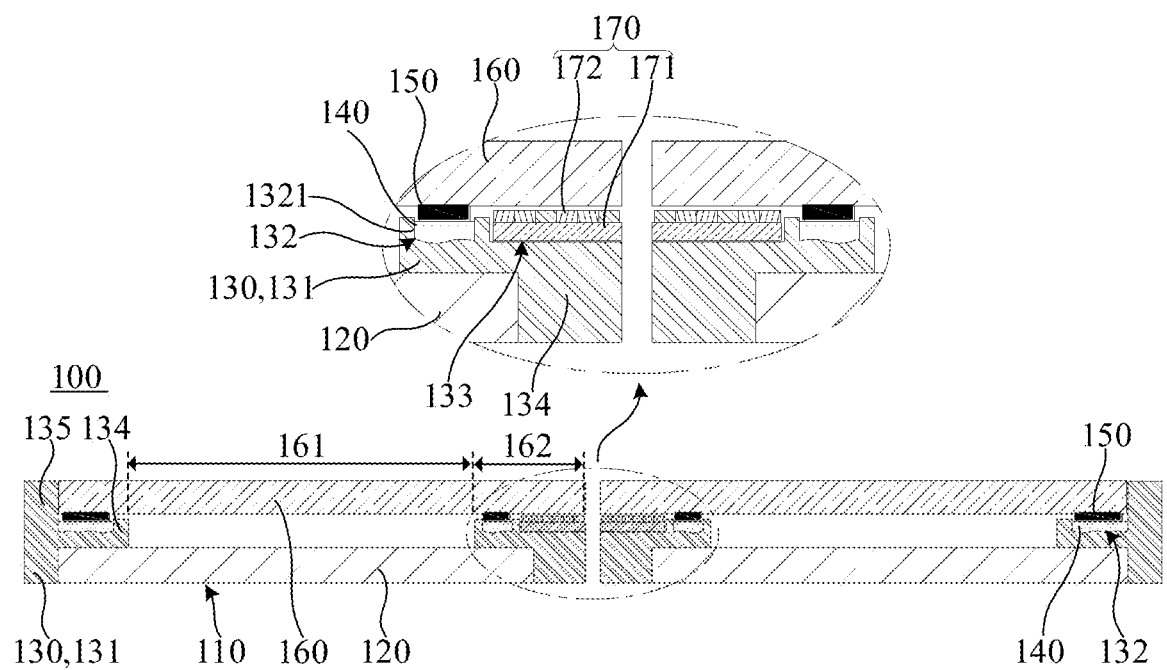
FIG. 12 is another schematic cross-sectional view taken along a direction A2-A2 in FIG. 7.

Specifically, as shown in FIG. 12, the display panel 160 includes a display area 161 and a light-transmitting area 162 disposed on at least one side of the display area 161. The display module 110 further includes an auxiliary display module 170 disposed between the light-transmitting area 162 of the display panel 160 and the frame body 131, and the auxiliary display module 170 is located at a side of the bonding adhesive 150. In this configuration, the light-transmitting region 162 is disposed at the side edges of the display module 110, and light emitted from the auxiliary display module 170 may be transmitted through the light-transmitting region 162, thereby realizing a narrow frame or frameless design of the display module 110. In this embodiment, the auxiliary display module 170 may be a light-emitting diode display module including a circuit board 171 and a light-emitting diode 172 disposed on the circuit board 171. The auxiliary display module 170 may be disposed as other kinds of display devices according to the actual conditions and the specific requirements, which is not limited herein.

Specifically, a sinking tank 133 is disposed on the surface (e.g., an upper surface) of the frame body 131. The sinking tank 133 is disposed on the surface of the supporting portion 134 of the frame body 131 at the spliced side. The auxiliary display module 170 is at least partially disposed in the sinking tank 133. For example, in an embodiment of the present disclosure, a portion of the auxiliary display module 170 is embedded in the sinking tank 133, and another portion of the auxiliary display module 170 is disposed to protrude with respect to the surface (e.g., an upper surface) of the frame body 131. Alternatively, the auxiliary display module 170 may be integrally embedded in the sinking tank 133 according to the actual conditions and the specific requirements, which is not limited herein. In this configuration, the sinking tank 133 is disposed on the frame body 131, and the auxiliary display module 170 is at least partially disposed in the sinking tank 133. With an avoidance structure of the sinking tank 133 described above, the display panel 160 may not be supported on the surface of the frame body 131 through the auxiliary display module 170 in the thickness direction, but may be supported on the planarization layer 140 through the bonding adhesive 150 in the thickness direction. Therefore, the flatness of the display panel 160 may be improved, and the auxiliary display module 170 is prevented from being crushed during an assembly process.

In an embodiment of the present disclosure, the display module 110 may be a liquid crystal display module 110. In this embodiment, the display module 110 further includes a backlight unit 120 on which the middle frame 130 is disposed. Alternatively, the display module 110 may also be other types of display components, according to the actual situations and the specific requirements, and is not limited only herein.

In an embodiment of the present disclosure, the spliced module 100 further includes a splicing bracket or a splicing mechanism for splicing, and at least two display modules 110 are spliced together by the splicing bracket or the splicing mechanism, to form the spliced module 100.

An embodiment of the present disclosure further provides a method for manufacturing the display module 110, and the method includes:

Step B1: providing a middle frame 130, wherein the accommodating groove 132 is disposed on the surface (e.g., the upper surface) of the middle frame 130;

Step B2: forming the planarization layer 140 in the accommodating groove 132; and Step B3: bonding the display panel 160 onto the planarization layer 140 by using the bonding adhesive 150. In this configuration, the planarization layers 140 are disposed in the accommodating grooves 132. Since the planarization layers 140 are formed by the leveling process, the planarization layers 140 have good surface flatness. By providing the display panel 160 on the planarization layer 140, the flatness of the display panel 160 can be improved, thereby improving the problem of the poor flatness of the display module 110. By splicing the at least two display modules 110 together, the spliced module 100 may be formed. Since the flatness of the display module 110 in the embodiment of the present disclosure may be 0.1 mm or less, different display modules 110 have the substantially same flatness. under the condition that the spliced module 100 is manufactured by using the display module 110, the unevenness at the seam can be improved, and the problem of poor optical quality such as light leakage can be avoided, so that the spliced module 100 can be mass-produced.

In an embodiment of the present disclosure, Step B2 includes:

Step B21: filling the accommodating groove 132 with a planarization material;

Step B22: curing the planarization material in the accommodating groove 132, to obtain the planarization layer 140. In this arrangement, by filling the planarization material having good fluidity in the accommodating groove 132, the liquid level of the planarization material has a better flatness due to the leveling effect of the planarization material in the accommodating groove 132. After the planarization material is cured, the planarization layer 140 having better surface flatness may be formed, so as to support the display panel 160 and improve the flatness of the display panel 160. In this embodiment, the planarization material may be, but is not limited to, a colloid. The planar material may be suitably changed according to the actual situations and the specific requirements, and is not limited herein.

Specifically, in the above-described Step B22, the planarization material in the accommodating groove 132 may be cured by an ultraviolet curing method, a thermal curing method, a moisture curing method, or the like, to form the planarization layer 140.

A display module, a manufacturing method of the display module, and a spliced module according to an embodiment of the present disclosure are described in detail above. Principle and implementations of the present disclosure are described by using specific examples. The description of the above embodiments is merely intended to help understand the method and the core idea of the present disclosure. At the same time, amendments and modifications will be made for those skilled in the art in both the detailed implementations and the scope under the teachings of the present disclosure. In sum, the presented description should not be construed as limiting the present disclosure.

What is claimed is:

1. A display module, comprising:
   a middle frame, wherein a plurality of accommodating grooves are disposed on a surface of the middle frame;
   a plurality of planarization layers, respectively disposed in the plurality of accommodating grooves, wherein supporting surfaces of the plurality of planarization layers are coplanar; and
   a display panel adhered onto the supporting surfaces of the plurality of planarization layers by a plurality of bonding adhesives, respectively,
   wherein the middle frame comprises at least two frame bodies disposed corresponding to at least two of four side edges of the display panel, and the plurality of accommodating grooves are respectively disposed on surfaces of two of the frame bodies disposed opposite to each other,
   wherein the display panel comprises a display area and a light-transmitting area, and the light-transmitting area is disposed on at least one side of the display area; and
   wherein the display module further comprises an auxiliary display module disposed between the light-transmitting area of the display panel and a corresponding one of the frame bodies, and the auxiliary display module is located on a side of a corresponding one of the plurality of bonding adhesives.

2. The display module according to claim 1, wherein a thickness of each of the plurality of planarization layers is less than or equal to a depth of each of the plurality of accommodating grooves.

3. The display module according to claim 1, wherein the middle frame comprises supporting portions disposed on a side of the plurality of bonding adhesives away from the display panel, the plurality of accommodating grooves are respectively disposed on surfaces of the supporting portions, and surfaces of the plurality of bonding adhesives close to the display panel protrude with respect to the surfaces of the supporting portions.

4. The display module according to claim 1, wherein a height difference between heights of bottom surfaces of the plurality of accommodating grooves is smaller than a depth of any of the plurality of accommodating grooves.

5. The display module according to claim 1, wherein the display panel is in a rectangular shape, the frame bodies are disposed at four side edges of the middle frame corresponding to the four side edges of the display panel, and the plurality of accommodating grooves are respectively disposed on the frame bodies at the four side edges of the display panel.

6. The display module according to claim 1, wherein each of the frame bodies is disposed with a corresponding one of the plurality of accommodating grooves.

7. The display module according to claim 1, wherein at least one of the frame bodies is disposed with at least two corresponding accommodating grooves of the plurality of accommodating grooves.

8. The display module according to claim 1, wherein a sinking tank is disposed on surfaces of the frame bodies, and the auxiliary display module is at least partially disposed in the sinking tank.

9. The display module according to claim 1, wherein flatness of the display module is 0.1 mm or less.

10. The display module according to claim 1, wherein a width of each of the accommodating grooves is tapered from a bottom of the accommodating groove toward a top of the accommodating groove.

11. A method of manufacturing a display module, comprising:
   providing a middle frame, wherein a plurality of accommodating grooves are disposed on a surface of the middle frame;
   forming a plurality of planarization layers respectively in the plurality of accommodating grooves, wherein supporting surfaces of the plurality of planarization layers are coplanar; and
   bonding a display panel onto the supporting surfaces of the plurality of planarization layers by using bonding adhesives,
   wherein the middle frame comprises at least two frame bodies disposed corresponding to at least two of four side edges of the display panel, and the plurality of accommodating grooves are respectively disposed on surfaces of two of the frame bodies disposed opposite to each other,
   wherein the display panel comprises a display area and a light-transmitting area, and the light-transmitting area is disposed on at least one side of the display area; and
   wherein the display module further comprises an auxiliary display module disposed between the light-transmitting area of the display panel and a corresponding one of the frame bodies, and the auxiliary display module is located on a side of a corresponding one of the plurality of bonding adhesives.

12. A spliced module, comprising at least two display modules spliced to each other, wherein each of the display modules comprises: a middle frame, wherein a plurality of accommodating grooves are disposed on a surface of the middle frame; a plurality of planarization layers, respectively disposed in the plurality of accommodating grooves, wherein supporting surfaces of the plurality of planarization layers are coplanar; and a display panel adhered onto the supporting surfaces of the plurality of planarization layers by a plurality of bonding adhesives, respectively; and wherein a portion of the middle frame at a non-spliced side of the display panel comprises supporting portions disposed on a side of the plurality of bonding adhesives away from the display panel and baffle plates disposed on the non-spliced side of the display panel, a portion of the plurality of accommodating grooves are disposed on surfaces of the supporting portions, and a portion of the middle frame at a spliced side of the display panel is disposed on the side of the plurality of bonding adhesives away from the display panel, wherein supporting surfaces of the plurality of planarization layers of one of the at least two display modules are coplanar with that of another one of the at least two display modules.

13. The spliced module according to claim 12, wherein a thickness of each of the plurality of planarization layers is less than or equal to a depth of each of the plurality of accommodating grooves.

14. The spliced module according to claim 12, wherein surfaces of the plurality of bonding adhesives close to the display panel protrude with respect to the surfaces of the supporting portions.

15. The spliced module according to claim 12, wherein the middle frame further comprises at least two frame bodies disposed corresponding to side edges of the display panel, and the plurality of accommodating grooves are respectively disposed on surfaces of two of the frame bodies disposed opposite to each other.

16. The spliced module according to claim 15, wherein a height difference between heights of bottom surfaces of the plurality of accommodating grooves is smaller than a depth of any of the plurality of accommodating grooves.

17. The spliced module according to claim 15, wherein the display panel is in a rectangular shape, the frame bodies are disposed at four side edges of the middle frame corresponding to four side edges of the display panel, and the plurality of accommodating grooves are respectively disposed on the frame bodies at the four side edges of the display panel.

* * * * *